United States Patent

Prateek et al.

(10) Patent No.: US 10,143,009 B2
(45) Date of Patent: Nov. 27, 2018

(54) ENHANCED RANDOM ACCESS MECHANISM IN WIRELESS COMMUNICATION SYSTEM

(75) Inventors: Basu Mallick Prateek, Bangalore (IN); Tushar Vrind, Bangalore (IN); Vinay Kumar Shrivastava, Bangalore (IN)

(73) Assignee: Samsung Electronics Co., Ltd., Suwon-si (KR)

(*) Notice: Subject to any disclaimer, the term of this patent is extended or adjusted under 35 U.S.C. 154(b) by 146 days.

(21) Appl. No.: 13/638,365

(22) PCT Filed: Apr. 1, 2011

(86) PCT No.: PCT/KR2011/002279
§ 371 (c)(1),
(2), (4) Date: Nov. 1, 2012

(87) PCT Pub. No.: WO2011/122904
PCT Pub. Date: Oct. 6, 2011

(65) Prior Publication Data
US 2013/0039314 A1 Feb. 14, 2013

(30) Foreign Application Priority Data
Apr. 1, 2010 (IN) .............. 934/CHE/2010

(51) Int. Cl.
*H04W 72/04* (2009.01)
*H04W 74/08* (2009.01)
*H04L 5/00* (2006.01)

(52) U.S. Cl.
CPC ........ *H04W 74/08* (2013.01); *H04L 5/0007* (2013.01)

(58) Field of Classification Search
USPC .................................. 370/328–338
See application file for complete search history.

(56) References Cited

U.S. PATENT DOCUMENTS

| 5,621,723 | A | 4/1997 | Walton, Jr. et al. |
| 6,885,652 | B1 | 4/2005 | Ozukturk et al. |
| 2009/0303954 | A1 | 12/2009 | Guo |
| 2010/0103867 | A1 | 4/2010 | Kishiyama et al. |
| 2010/0130137 | A1* | 5/2010 | Pelletier et al. .......... 455/68 |

(Continued)

FOREIGN PATENT DOCUMENTS

| CN | 101340711 A | 1/2009 |
| KR | 10-2009-0107029 A | 10/2009 |

(Continued)

OTHER PUBLICATIONS

R1-100839 Final Report of 3GPP TSG RAN WG1 #59bis v1.0.0, Feb. 22, 2010.

(Continued)

*Primary Examiner* — Brandon M Renner
(74) *Attorney, Agent, or Firm* — Jefferson IP Law, LLP

(57) ABSTRACT

The present invention proposes a mechanism to update/include the MAC Control information elements like PHR and BSR etc which are reported to ENB to schedule, maintain and operate the reporting UE. It also provides methods and means to handle Msg3 formation and reformation when RACH fails on one component carrier and is continued on another in Carrier Aggregation. New triggers for BSR and PHR reporting are provided in this scenario.

6 Claims, 1 Drawing Sheet

(56) References Cited

U.S. PATENT DOCUMENTS

| | | | | |
|---|---|---|---|---|
| 2010/0158147 A1* | 6/2010 | Zhang | ............... | H04W 52/146 375/260 |
| 2010/0238863 A1* | 9/2010 | Guo et al. | ..................... | 370/328 |
| 2012/0057547 A1* | 3/2012 | Lohr et al. | ................... | 370/329 |
| 2012/0182958 A1* | 7/2012 | Pelletier et al. | ............. | 370/329 |
| 2012/0309404 A1* | 12/2012 | Suzuki | ................. | H04W 24/10 455/450 |

FOREIGN PATENT DOCUMENTS

| KR | 10-2009-0128344 A | 12/2009 |
|---|---|---|
| WO | 2008/155469 A1 | 12/2008 |

OTHER PUBLICATIONS

"LTE; Evolved Universal Terrestrial Radio Access (E-UTRA); Medium Access Control (MAC) protocol specification (3GPP TS 36.321 version 8.4.0 Release 8)" ETSI Ts 136 321 v8.4.0, Jan. 2009.

3GPP TS 36.321. V9.1.0, 3rd Generation Partnership Project; Technical Specification Group Radio Access Network; Evolved Universal Terrestrial Radio Access (E-UTRA) Medium Access Control (MAC) Protocol Specification (Release 9), p. 25-27, Dec. 2009.

R2-101058, 3GPP TSG-RAN WG2 Meeting #69, CATT, Consideration on RACH in CA [online], Feb. 22-26, 2010, San Francisco, CA.

R2-101391, 3GPP TSG-RAN WG2 #69, Linking of Downlink CC to Uplink CC, Feb. 22-26, 2010, San Francisco, CA.

Huawei, Considerations on SI for DC-HSUPA, 3GPP TSG RAN WG2 Meeting #66, R2-093152, May 8, 2009, p. 1-p. 3.

LG Electronics Inc., CC Activation/Deactivation Details, 3GPP TSG-RAN2 Meeting #69, R2-101492, Feb. 26, 2010, p. 1-p. 3.

BSR consideration when Contention Resolution failure, ASUSTeK, R2-081848, XP050139542, Mar. 31-Apr. 4, 2008, Shenzhen, China.

RACH for Carrier Aggregation, LG Electronics Inc., R2-100336, XP050421035, Jan. 18-22, 2010, Valencia, Spain.

RACH and carrier aggregation, Nokia Corporation, Nokia Siemens Networks, R2-101285, XP050421787, Feb. 22-26, 2010, San Francisco, USA.

RACH for connected mode in carrier aggregation, Fujitsu, R2-101541, XP050421882, Feb. 22-26, 2010, San Francisco, USA.

Samsung; Corrections on PHR; 3GPP TSG-RAN2#64bis meeting; Tdoc R2-090489; Jan. 12-16, 2009; Ljubljana, Slovenia.

\* cited by examiner

[Fig. 1]
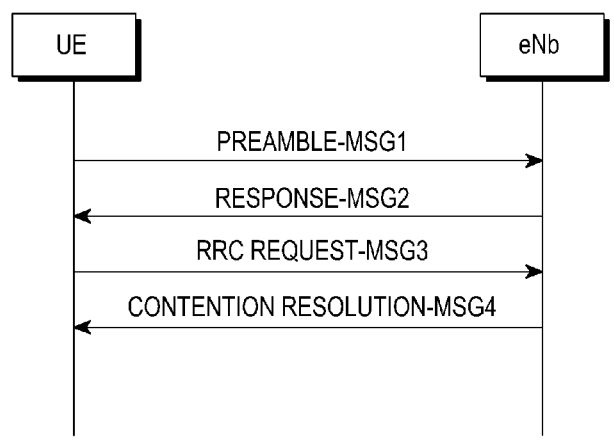
[Fig. 2]
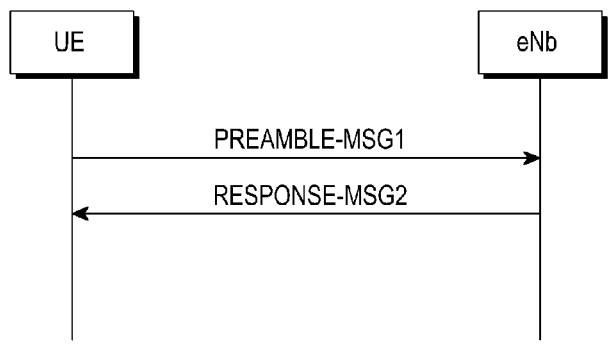

ENHANCED RANDOM ACCESS MECHANISM IN WIRELESS COMMUNICATION SYSTEM

TECHNICAL FIELD

The invention relates to the field of wireless communication and more particularly, it relates to the random access mechanism.

BACKGROUND ART

A Random Access Channel (RACH) is an uplink channel in mobile communication system used for transferring control information from a mobile terminal to the network, e.g. for initial access to set up a connection or for location area updates. The RACH channel is a contention based channel where several users might access the same resource. There is usually no knowledge about the required transmit power of the mobile terminal and thus an open loop power control method is applied. Currently the successor of 3G UMTS, called 3rd generation partnership project (3GPP) long term evolution (LTE), is being standardized. Unlike universal mobile terrestrial system (UMTS) that uses wideband code division multiple access (WCDMA) in the uplink, LTE is based on Single Carrier orthogonal frequency division multiple access (OFDMA).

DISCLOSURE OF INVENTION

Technical Problem

In Rel-10 version of LTE, also called LTE-Advanced there is introduction of Carrier Aggregation, where two or more component carriers (CCs) are aggregated in order to support wider transmission bandwidths up to 100 MHz and for spectrum aggregation.

Carrier aggregation is supported for both contiguous and non-contiguous component carriers. It is possible to configure a UE to aggregate a different number of component carriers originating from the same eNB and of possibly different bandwidths in the UL and the DL.

Solution to Problem

Therefore, the present invention provides a random access procedure, and proposes an improvement in the method therefore.

The present invention proposes a mechanism to update/include the MAC Control information elements like PHR and BSR etc which are reported to ENB to schedule, maintain and operate the reporting UE. It also provides methods and means to handle Msg3 formation and reformation when RACH fails on one component carrier and is continued on another in Carrier Aggregation. New triggers for BSR and PHR reporting are provided in this scenario.

Accordingly the present invention provides a method for including the MAC control information elements in the msg3 packet based on the grant received in the msg2 from the network in case msg3 is being transmitted first time. Further, the method comprises of determining if any MAC control triggers have become active since prior transmission(s) of msg3, and incorporating updated MAC control information or new MAC control information elements corresponding to these triggers for retransmission.

Accordingly the present invention provides a new BSR trigger to be invoked when switching from CC to another on RACH failure on the first CC and thereby, eliminating the aforementioned problem. Similarly, the invention provides a new PHR trigger when switching component carrier for RACH continuation. Consequently, UE is provided with a method to again include and/or update PHR information in the Msg3 during RACH attempt on other component carrier.

Accordingly the present invention msg3 is discarded on RACH failure on a CC and the BSR and PHR information is included in the newly formed Msg3 based on the triggers including the new BSR and PHR trigger proposed in the invention.

Accordingly the present invention provides maximum transmission of preamble (PREAM_MAX_TRANS) is taken as condition for considering failure of RACH on a component carrier. Consequently, when preamble transmission count equals or exceeds this, RACH switching to another component carrier is triggered. Another approach to decide carrier switching for RACH retrial is when the linked DL CC gets deactivated when UE is performing RACH on an UL CC.

Accordingly the present invention provides describes various aspects related to CC selection for initial RACH and/or RACH retrials.

Accordingly the present invention describes the method of switching of carrier for RACH retrial is undertaken, a carrier specific MAC reset is performed.

Accordingly in present invention, methods for preventing the loss of RLC PDUs included in msg3 are described.

Accordingly in the present invention, the RACH is initiated because of arrival of user data or signaling message (e.g. RRC connection request) in L2 buffer (RLC buffer) or when ordered by network through PDCCH order. The arrival of data or signaling message triggers a BSR which in turn initiates SR and RACH. However, it is proposed in invention that for the case component carrier addition RRC indicates directly to MAC layer to initiate RACH and not generate or buffer any signaling message in L2 buffer.

Further, the carrier switching for RACH retrial is not performed when RACH fails on the specified carrier and RACH failure indication is given from MAC to RRC layer. The approach ensures that in case of RACH failure, the signaling message does get stuck (uncleared) in L2 buffer. Otherwise an RLC reestablishment or reset would be required which would be problematic as other data also lies in RLC buffer.

Advantageous Effects of Invention

The proposed present invention can be readily incorporated and utilized in random access mechanism employed in wireless communication systems e.g. LTE, LTE-Advanced etc.

BRIEF DESCRIPTION OF DRAWINGS

FIG. 1 depicts a block diagram describing the message exchange during contention based random access.

FIG. 2 depicts a block diagram describing the message exchange during non-contention based random access.

BEST MODE FOR CARRYING OUT THE INVENTION

The present invention proposes a mechanism to update/include the MAC Control information elements like PHR and BSR etc which are reported to ENB to schedule, maintain and operate the reporting UE. It also provides methods and means to handle Msg3 formation and reformation when RACH fails on one component carrier and is continued on another in Carrier Aggregation. New triggers for BSR and PHR reporting are provided in this scenario.

The proposed invention addresses the shortcomings of existing random access procedure during carrier switch applicable when more than one carrier are available for performing Random Access. It has been envisaged that the random access payload will change from carrier to carrier. Thus it becomes essential to devise a mechanism for the UEs to follow during Random access retrials in such scenarios. The invention broadly discusses the methods to update messages exchanged between UE and the network.

In accordance to 3GPP LTE MAC Specification, Msg3 is created once and is stored and same message is retransmitted when required. With the procedure, the system introduces an error in MAC control element (CE) reporting for information elements which are time varying (for example power head room report (PHR), buffer status report (BSR) etc). In the present disclosure, we outline a procedure, which can change the MAC control information elements in the Msg3, based on validity, reporting triggers, new values of MAC control elements, change of component carriers and application of new MAC control elements. The method reports correct and latest information of MAC control information elements to the eNB, and help the eNB to schedule UEs in a better way.

The random access procedure is performed by an UE (User equipment or a mobile device), primarily to get initial access to the air interface resources in a wireless communication system. Prior to initiating the random access procedure, the UE needs to decode the System Information messages which indicates the Random access channel parameters for the radio cell (number, frequency position, time period, and timing offset), preamble format for the cell, sequence indices, power ramping step size, maximum number of preamble retransmissions etc. There are two types of procedures for random access, the first one being the contention based and the second one being the non-contention based.

In the contention based procedure, the preamble is randomly chosen by the UE;

however in case of non-contention based procedure, the preamble to be used by the UE is indicated by the network by means of dedicated signaling. The preamble is reserved by the Base Station (network entity) for the corresponding UE thereby avoiding the contention phase as in contention based random access as shown in FIG. 1.

The contention based random access, is a four step procedure. Msg1 includes the random access preamble, which could be any one out of the 64 possible preamble sequences associated with each cell. The physical resource (time-frequency grid) for the PRACH transmission is randomly chosen from within the set of available PRACH resources. For transmitting Msg1, the initial power target value (PREAMBLE_INITIAL_RECEIVED_TARGET_POWER or Po_pre) is obtained from the System Information, for retransmission of Msg1 the power is increased in step size (POWER_RAMP_STEP or dP_rampup) which is indicated via System Information.

Also, the maximum number of retransmissions (PREAMBLE_TRANS_MAX) allowed is indicated via a parameter in the System Information. Based on the knowledge of the three parameters, and the downlink path loss measurements done independently by the UE, an Outer Loop Power control algorithm calculates the transmit power for Msg1 given by Equation 1, where Pmax, is maximum transmit power that the MS can transmit with, PL is the measured downlink path-loss, N_pre is the iteration number of the preamble retransmission, where $0 < N_{pre} < (\text{PREAMBLE\_TRANS\_MAX}+1)$.

$$P_{preamble}(N_{pre}) = \min(P\max, PL + Po_{pre} + (N_{pre}-1)^* dP_{rampup})$$  Equation 1

After transmitting Msg1, the UE needs to wait for a random access response (RAR), or Msg2 for which the UE needs to monitor the PDCCH (control channel) associated with the RA-RNTI (Random ID) with-in the window of RA response time (a few TTIs—Transmission Time Interval as signaled in the System Information). The RA-RNTI associated with the PRACH resource is calculated using Equation 2, where $t_{id}$ is the index of the first sub-frame of the specified PRACH resource ($0 \le t_{id} < 10$), and $f_{id}$ is the index of the specified PRACH resource within that sub-frame, in ascending order of frequency domain ($0 \le f_{id} < 6$).

$$RA\text{-}RNTI = t_{id} + 10^* f_{id}$$  Equation 2

In Msg2 (DL-SCH: Downlink Shared Channel), the UE will receive the Timing Alignment value, the resources (uplink grant) which the UE can utilize to transmit Msg3, temporary identifier C-RNTI which the MS needs to include in Msg3. In the event, that Msg2 is not received within the RA response time, the user equipment (UE) may initiate Msg1 retransmission with a power ramp up as explained above.

Msg3 is used for higher layer signaling, where-in the temporary C-RNTI obtained in Msg2, and another unique id, that can be used for contention resolution is used over the granted uplink resource (UL-SCH: Uplink Shared Channel).

After transmission of Msg3, UE needs to monitor the PDCCH for the temporary C-RNTI (Msg4) until the expiry of Contention resolution timer. In case, the PDCCH is successfully decoded, the UE will verify the MAC PDU (on DL-SCH) for the unique id which the UE had encoded in Msg3, and the UE consider itself to be a winner or loser of the contention resolution. Thereafter the procedure of Uplink and Downlink data transfer initiates, and Random Access procedure is considered to be completed.

As shown in FIG. 2, for the non-contention based random access, the UE is allocated a random access (RA) preamble by the enhanced NodeB (eNB), which the UE needs to make use of during preamble transmission step (Msg1). The corresponding random access procedure (transmission of Msg1 and reception of Msg2) is similar to the case for contention based RACH.

In accordance to LTE MAC Specification, after grant reception and after first successful random access response message (Msg2), MAC needs to obtain the MAC PDU to transmit from the "Multiplexing and assembly" entity. Depending on the grant size, MAC would add control information elements like buffer status report (BSR) and power head room report (PHR) are included in the MAC PDU based on the triggers at that instant (Prohibit Timer and Periodic timer) and the MAC PDU is stored in the Msg3 Buffer.

The PHR reporting is used to provide the serving eNB with information about the difference between the nominal UE maximum transmit power and the estimated power for UL-SCH transmission. The PHR is triggered if any of the following events occur:

The PROHIBIT_PHR_TIMER expires or has expired and the path loss has changed more than DL_Pathloss-Change dB since the last power headroom report when UE has UL resources for new transmission;

The PERIODIC PHR TIMER expires, in which case the PHR is referred below to as Periodic PHR;

Upon configuration and reconfiguration of a Periodic PHR.

The Buffer Status reporting procedure is used to provide the serving eNB with information about the amount of data available for transmission in the UL buffers of the UE. There are multiple triggers for BSR reporting like timer based or event based as detailed below.

UL data becomes available for transmission and either the data belongs to a logical channel with higher priority than the priorities of the logical channels which belong to any Logical Channel Group (LCG) and for which data is already available for transmission, or there is no data available for transmission for any of the logical channels which belong to a LCG.

UL resources are allocated and number of padding bits is equal to or larger than the size of the Buffer Status Report MAC control element plus its subheader.

retxBSR-Timer expires and the UE has data available for transmission for any of the logical channels which belong to a LCG.

periodicBSR-Timer expires.

All triggered BSRs are cancelled in case the UL grant can accommodate all pending data available for transmission but is not sufficient to additionally accommodate the BSR MAC control element plus its subheader. All triggered BSRs are also cancelled when a BSR is included in a MAC PDU for transmission.

In carrier aggregation scenario, when RACH attempt fails on one carrier UE may continue the RACH on another carrier and possibly on all other carriers one after the other until success. During this retrial UE can re-initiate the step 1 through 4 in case of on the other carrier as well. If it does not succeed, RACH failure is indicated by MAC to upper layers.

The present invention provides means to targets the mentioned problems and shortcomings of the method described in the prior art, and overcome them namely:

1. Reporting of MAC control information elements are not carrying updated values in the subsequent transmissions of Msg3 and thereby stale values are reported to eNB.

2. When triggered in between transmissions of Msg3, Reporting of MAC control information is not included in subsequent transmissions of Msg3.

3. When the triggers cease or become no longer applicable, undesired reporting of stale MAC control information is still performed.

4. When RLC PDUs are included in Msg3 in Carrier Aggregation scenarios and RACH retrials are done on component carriers, undesired loss of RLC PDUs occur.

5. When RACH fails on one component carrier the BSR and/or PHR triggers are cancelled or ceased, therefore no new BSR and/or PHR information is included when re-attempting RACH on another component carrier.

The prior art suffers from potential problem of not correctly handling the MAC control information reporting in cases of failures in the RACH procedure.

LTE System

In the method described in the prior art, same Msg3 PDU (stored in Msg3 buffer) will be retransmitted (which includes the older MAC control information elements). Random access (RA) procedure can take any amount of time for the completion of the Random access e.g. there would be delay because of contention resolution phase, delay as UE applies the back-off before initiating a new RACH attempt, Msg1 or preamble transmission delay (there is endless preamble transmission attempt till success), delay in getting random access success (msg2) etc. The delays would be added up.

Therefore, the MAC control information which will be reported would be invalid or outdated. Moreover, only one RACH attempt or iteration is considered. However, there may be many such RACH iterations possible before UE completes RACH procedure successfully e.g. Network may be overloaded. In such cases, the delay becomes excessively large.

Further, the reporting of MAC control information elements could be triggered in between the transmissions of Msg3 e.g. a PHR reporting is triggered after first transmission of Msg3 not including the PHR report. However, method described in the prior art suffers from the deficiency of not reporting PHR in the subsequent retransmissions of Msg3. Similarly, if the triggers for MAC control information reporting cease or become not applicable between transmissions of Msg3, the method described in the prior art is not able to avoid reporting of the elements in subsequent retransmissions.

In one embodiment, the invention includes method for including the MAC control information elements in the msg3 packet based on the grant received in the msg2 from the network in case msg3 is being transmitted first time. Further, the method comprises of determining if any MAC control triggers have become active since prior transmission(s) of msg3, and incorporating updated MAC control information or new MAC control information elements corresponding to these triggers for retransmission.

The method also incorporates determining if any MAC control triggers have ceased or no longer applicable since prior transmission(s) of msg3, removing related MAC control information corresponding to these triggers for Msg3 retransmission and/or incorporating new MAC control information elements in the space getting available after this removal.

LTE-Advanced Carrier Aggregation

In Carrier Aggregation where the Msg3 includes a BSR (e.g. UL data arrival case) and RACH fails on one CC and it is continued on another CC. As per BSR procedure, BSR trigger would be cancelled when BSR information is included in MAC PDU (msg3) transmission. Also, possibly BSR trigger would also be cancelled when all pending data is accommodated but BSR control information could not be included in the MAC PDU.

Consequently, there may not be any BSR trigger available when continuing RA on another CC and therefore, BSR information cannot be included when attempting RACH on another CC. The proposed invention provides a new BSR trigger to be invoked when switching from CC to another on RACH failure on the first CC and thereby, eliminating the aforementioned problem. Similarly, the invention provides a new PHR trigger when switching component carrier for RACH continuation. Consequently, UE is provided with a method to again include and/or update PHR information in the Msg3 during RACH attempt on other component carrier.

In another embodiment, the invention provides a method in which the Msg3 used for RACH attempt on one CC when determined to be failed, is discarded and a new Msg3 is formed while RACH is continued on another CC. BSR and PHR information is included in the newly formed Msg3 based on the triggers including the new BSR and PHR trigger proposed in the invention.

Msg3 formed during Uplink data arrival will contain BSR, PHR (if required) and may also include RLC SDU in the case when grant is sufficient. During Random access retries on another CC, as the previous Msg3 buffer is discarded, it is possible that the RLC SDU (part of Msg3) also gets discarded. In one approach this loss can be recovered by retransmission based on NACK received later during the data transmission. In another method MAC does selectively discard of Msg3 of the previous CC and keep the non MAC specific (RLC PDU) to be included during the Msg3 formation on the new CC. One other approach includes indication of transmission failure (or negative acknowledgement) of the RLC PDU from MAC to relevant RLC entity for the RLC PDUs included in msg3 and RLC entity undertakes the said PDUs for transmission again. As in yet another approach, RLC PDUs are not included during Msg3 formation and thereby the problem is prevented from arising.

In one more embodiment, the maximum transmission of preamble (PREAM_MAX_TRANS) is taken as condition for considering failure of RACH on a component carrier. Consequently, when preamble transmission count equals or exceeds this, RACH switching to another component carrier is triggered. Another approach to decide carrier switching for RACH retrial is when the linked DL CC gets deactivated when UE is performing RACH on an UL CC.

In one method, UE switches the carrier for RACH retrial on seeing backoff field present in Random access response (RAR) message (msg2). Another method involves ENB redirecting the UE to switch to another carrier while doing RACH by indicating a new field redirection in the msg2. On switching carrier for RACH after receiving backoff or redirection, BSR, PHR and other MAC control information are updated/included.

In another embodiment, aspects related to CC selection for initial RACH and/or RACH retrials are described. MAC maintains a RACH CC Set which has all the possible ULCCs on which Random access can be attempted. MAC further considers if the corresponding DL-CC for the UL-CC is active or not, in case DL-CC is deactivated/removed, the corresponding UL-CC is not be used in the RACH CC Set. The RACH CC Set should be sorted based on CC attributes and parameters which include DL CC path loss, expected initial transmit power for Preamble, availability of preamble groups on UL-CC, previous RACH success history etc. Availability of measurement gaps is also considered for every CC while PRACH resource availability on a CC is evaluated.

Further, CCs which do not have compatible preamble group configuration are not used in RACH CC Set for RACH retrials. UE selects only those UL CCs for RACH retrials which provides same preamble group. This ensures that the UL grant received in msg2 would be same as previously received grants in msg2 in previous RACH attempts. UL CCs on which RACH had failed recently could also be avoided for further CC selection and RACH retrials.

In a further embodiment, whenever switching of carrier for RACH retrial is undertaken, a carrier specific MAC reset is performed. It involves reset/initialization of timers, parameters, state variables, buffer-clearing specific to the carrier on which RACH failed.

E.g. PHR timer specific to the carrier is stopped/reset/initialized; UL/DL HARQ buffer(s) are cleared. Further, carrier specific MAC reset is performed when an UL carrier and/or its linked DL carrier is activated and/or deactivated. As further enhancement, BSR/PHR triggers are invoked when an UL carrier and/or its linked DL carrier is activated and/or deactivated.

In general, RACH is initiated because of arrival of user data or signaling message (e.g. RRC connection request) in L2 buffer (RLC buffer) or when ordered by network through PDCCH order. The arrival of data or signaling message triggers a BSR which in turn initiates SR and RACH. However, it is proposed in invention that for the case component carrier addition RRC indicates directly to MAC layer to initiate RACH and not generate or buffer any signaling message in L2 buffer. Further, the carrier switching for RACH retrial is not performed when RACH fails on the specified carrier and RACH failure indication is given from MAC to RRC layer. The approach ensures that in case of RACH failure, the signaling message does get stuck (uncleared) in L2 buffer.

Otherwise an RLC reestablishment or reset would be required which would be problematic as other data also lies in RLC buffer.

As described the present disclosure targets the problems and provides methods to overcome the shortcomings of the prior art.

The key features of the disclosure are:

1. Formation and reformation of Msg3 used for Random access procedure.

2. Method of assisting the scheduler at eNB; in scheduling and maintenance of multiple users in the network.

3. Avoiding undesired reporting of stale information to the eNB scheduler and thereby, preventing incorrect operation of the scheduler.

4. Method for updating MAC control information elements e.g. power headroom information and Buffer status information to be reported in the Msg3 retransmissions to the eNB scheduler.

5. Inclusion of MAC control information like power headroom information and Buffer status information in the Msg3 retransmission(s) when these information become available or their reporting is triggered after earlier transmission(s).

6. Removal of MAC control information like power headroom information and Buffer status information in the Msg3 retransmission(s) when these information becomes invalid or need not be reported as the reporting triggers become no longer applicable after earlier transmission(s).

7. When determining to remove the MAC control information from the Msg3, fill up the space with padding or other MAC control information elements and appropriately inclusion of padding or other MAC control information headers or indicators.

8. When determining to add the MAC control information in the Msg3, reform the PDU appropriately with removal of padding or padding headers or indicators and inclusion of appropriate headers for control information elements.

9. Update of Mac control information elements even when performing HARQ retransmissions of Msg3 based on applicable reporting triggers.

10. When updating particular Mac control information in Msg3 retransmission, appropriate change or formatting of other MAC control information is performed.

E.g. If the PHR reporting is removed from Msg3 retransmission, a short or truncated BSR MAC control information could be replaced with a long BSR MAC control information.

11. As another approach, altogether avoiding the reporting of one or more MAC control information elements in Msg3 retransmissions which were included in earlier Msg3 transmission.

12. As one more approach in Carrier Aggregation, when RACH retrial is performed on another component carrier, the Msg3 used on first component carrier is discarded and a new Msg3 is formed.

13. In another method, During RACH retrial on another component carrier, Msg3 used on first CC is selectively updated with latest applicable MAC elements including BSR, PHR and/or RLC PDUs etc.

14. When RACH is failed on one component carrier and is switched on to another CC, a new BSR and/or PHR is triggered. This enables inclusion/update of BSR and/or PHR information in Msg3 for the RACH retrial on another CC.

15. Maximum transmission of preamble (PREAM_MAX_TRANS) is taken as condition for considering failure of RACH on a component carrier. Consequently, when preamble transmission count equals or exceeds this, RACH switching to another component carrier is triggered.

16. In one approach the loss of RLC PDUs included in Msg3 when RACH fails on one component carrier is recovered based on NACK received from peer RLC entity later during the data transmission.

17. In another method MAC does selectively discard of Msg3 of the previous CC and keep the non MAC specific (RLC PDU) to be included during the Msg3 formation on the new CC.

18. One approach includes indication of transmission failure (or negative acknowledgement) of the RLC PDU from MAC to relevant RLC entity and RLC entity undertakes the said PDUs for transmission again.

19. As yet another approach, RLC PDUs are not included during Msg3 formation and thereby the problem is prevented from arising.

20. Maintaining a RACH CC Set and sorting them with respect to linked DL CC path loss, availability of preamble groups on UL CC, expected initial transmit power for preamble etc. Removing from RACH CC set UL CC(s) when linked DL CC(s) are deactivated or UL CC do not provide compatible preamble groups for RACH retrials e.g. UE does not select UL CCs which do not have same preamble group while RACH retrials and thereby do not provide same grants for msg3.

21. Carrier switching for RACH retrial is undertaken when linked DL CC gets deactivated for the UL CC for which RACH is being performed.

22. Carrier switching for RACH retrial is undertaken when backoff or redirection is indicated by ENB in msg2.

23. BSR, PHR and other MAC control information are updated/included when switching CC after backoff or redirection.

24. Whenever switching of carrier for RACH retrial is undertaken, a carrier specific MAC reset is performed. It involves reset/initialization of timers, parameters, state variables, buffers clearing specific to the carrier on which RACH failed.

25. Carrier specific MAC reset is performed when an UL carrier and/or its linked DL carrier is activated and/or deactivated. As further enhancement, BSR/PHR triggers are invoked when an UL carrier and/or its linked DL carrier is activated.

The proposed present invention can be readily incorporated and utilized in random access mechanism employed in wireless communication systems e.g. LTE, LTE-Advanced etc.

The invention claimed is:

1. A method for transmitting a power headroom report (PHR) by a terminal in a wireless communication network supporting carrier aggregation, the method comprising:
   receiving control information for activating a secondary cell with a first uplink carrier from a base station;
   identifying the secondary cell to be activated based on the received control information;
   transmitting a first PHR for at least one serving cell in response to the identified secondary cell being activated with the first uplink carrier;
   deciding a carrier switching for a random access retrial in response to a failure of a random access procedure on the first uplink carrier, wherein the carrier switching for the random access retrial is decided when a downlink carrier linked with the first uplink carrier is deactivated when performing the random access procedure on the first uplink carrier;
   performing the random access procedure on a second uplink carrier decided by the carrier switching, wherein the performing the random access procedure comprises transmitting a second PHR for at least one serving cell;
   determining that only a prohibit PHR timer expires or has expired and a path loss has changed for a downlink carrier corresponding to the second uplink carrier since a last PHR transmission when the terminal has uplink resources for a new transmission; and
   transmitting a third PHR for at least one serving cell in response to a determination that the prohibit PHR timer expires or has expired and the path loss has changed for the downlink carrier corresponding to the uplink carrier of the activated secondary cell since the last PHR transmission when the terminal has uplink resources for a new transmission.

2. The method of claim 1, further comprising transmitting a PHR, in response to a periodic PHR timer expiration.

3. The method of claim 1, further comprising transmitting a PHR, upon one of a configuration and a reconfiguration of the PHR.

4. An apparatus for transmitting a power headroom report (PHR) by a terminal in a wireless communication network supporting carrier aggregation, the apparatus comprising:
   a receiver configured to receive control information for activating a secondary cell with a first uplink carrier from a base station; and
   at least one processor configured to:
      identify the secondary cell to be activated based on the received control information,
      transmit a first PHR for at least one serving cell in response to the identified secondary cell being activated with the first uplink carrier,
      decide a carrier switching for a random access retrial in response to a failure of a random access procedure on the first uplink carrier, wherein the carrier switching for the random access retrial is decided when a downlink carrier linked with the first uplink carrier is deactivated when performing the random access procedure on the first uplink carrier,
      perform the random access procedure on a second uplink carrier decided by the carrier switching, wherein the performing the random access procedure comprises transmitting a second PHR for at least one serving cell,
      determine that only a prohibit PHR timer expires or has expired and a path loss has changed for a downlink carrier corresponding to the second uplink carrier since a last PHR transmission when the terminal has uplink resources for a new transmission, and
      transmit a third PHR for at least one serving cell in response to a determination that the prohibit PHR timer expires or has expired and the path loss has changed for the downlink carrier corresponding to the uplink carrier of the activated secondary cell since the last PHR transmission when the terminal has uplink resources for a new transmission.

5. The apparatus of claim 4, wherein the at least one processor is configured to transmit a PHR, in response to the periodic PHR timer expiration.

6. The apparatus of claim 4, wherein the at least one processor is configured to transmit a PHR, upon one of a configuration and a reconfiguration of the PHR.

* * * * *